(12) United States Patent
Streett et al.

(10) Patent No.: US 6,301,656 B1
(45) Date of Patent: Oct. 9, 2001

(54) METHOD AND APPARATUS FOR INITIAL PROGRAMMING OF FLASH BASED FIRMWARE

(75) Inventors: David J. Streett; Neil E. Glassie, both of Lewisville, TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/228,472

(22) Filed: Jan. 11, 1999

(51) Int. Cl.[7] .................................................. G06F 9/445
(52) U.S. Cl. ................................................................ 713/2
(58) Field of Search ................................. 713/1, 2, 100

(56) References Cited

U.S. PATENT DOCUMENTS

| | | | |
|---|---|---|---|
| 5,805,882 | * | 9/1998 | Cooper et al. ............................ 713/2 |
| 5,887,145 | * | 3/1999 | Harari et al. . |
| 5,909,502 | * | 6/1999 | Mazur .................................... 382/135 |
| 6,072,726 | * | 6/2000 | Hwang et al. ................... 365/185.33 |
| 6,138,233 | * | 10/2000 | Lim .......................................... 713/1 |
| 6,154,837 | * | 11/2000 | Fudeyasu et al. ........................ 713/2 |

\* cited by examiner

Primary Examiner—Thomas M. Heckler
(74) Attorney, Agent, or Firm—Baker Botts L.L.P.

(57) ABSTRACT

An apparatus for programming flash based firmware is disclosed. The apparatus comprises a programmable control card (20) and a processor card (10). The programmable control card (20) includes a control card connector (22) and a programmable flash device (26). The processor card (10) includes a programming connector (12), a processor (16) and on-board flash devices (18). The control card (20) is operable to connect to the processor card (10) by connecting the control card connector (22) with the programming connector (12). Upon starting the processor card (10) control card (20) is operable to transfer programming code to the processor card (10).

14 Claims, 1 Drawing Sheet

US 6,301,656 B1

METHOD AND APPARATUS FOR INITIAL PROGRAMMING OF FLASH BASED FIRMWARE

TECHNICAL FIELD OF THE INVENTION

The present invention relates in general to electronic devices and more particularly to a method and apparatus for initial programming of flash based firmware.

BACKGROUND OF THE INVENTION

Flash memory (also known as EEPROMs) are often used in systems where a microprocessor is embedded on a control board. The flash memory provides programming to the microprocessor. The advantage of using flash memory is that they are capable of having old programming removed and new programming installed. Therefore, updated software can be loaded onto the flash memory to be used by the microprocessor.

In a typical operation, on power up, a control board, including a microprocessor, executes its on-board programming which includes a setup protocol for establishing communication with components external to the control board. Once communication is established, the microprocessor can receive a new programming load. This programming is written onto the flash memory. When a board with an embedded processor is originally built, the flash memory must be programmed with a boot code so that the board can establish communication with the outside world. This is typically done by taking unprogrammed flash memories and placing them on a programmer. They are then programmed and replaced on the board. The board is then booted and the programming can be loaded from the flash memory to the microprocessor. If a new boot code is required, the flash devices are removed, reprogrammed and then reinstalled. To allow for removal, flash memories are typically installed in sockets instead of being soldered onto the board. The handling of flash memory can damage its metal leads or produce dangerous static electricity which can damage the memories. Also, using a programmer to program flash memory is a slow process.

SUMMARY OF THE INVENTION

From the foregoing, it may be appreciated that a need has arisen for a method and apparatus for initial programming of flash based firmware. In accordance with the present invention a method and apparatus for initial programming of flash based firmware is provided which substantially eliminates or reduces the disadvantages and problems associated with prior programming methods.

In one embodiment an apparatus for programming flash based firmware is disclosed. The apparatus comprises a programmable control card and a processor card. The programmable control card includes a control card connector and a programmable flash device. The processor card includes a programming connector, a processor and on-board flash devices. The control card is operable to connect to the processor card by connecting the control card connector with the programming connector. Upon starting the processor card, the control card is operable to transfer programming code to the processor card.

The present invention provides various technical advantages over the conventional programming methods. For example, flash devices may be reprogrammed without removing them a multitude of times. Another technical advantage is that different code can be loaded at different times using the present invention. Additionally, testing procedures can be programmed efficiently into flash devices located on a microprocessor control board. Other technical advantages are readily apparent to one skilled in the art from the following figures, descriptions and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like s, in which.

DETAILED DESCRIPTION OF THE INVENTION

Figure 1:
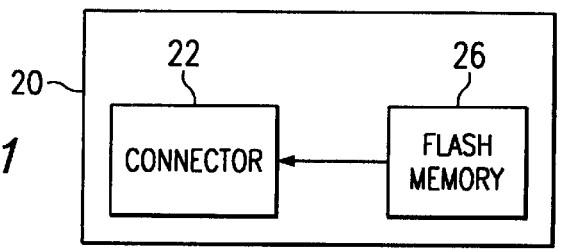
FIG. 1 illustrates a programming card in accordance with the teaching the present invention.
Figure 2:
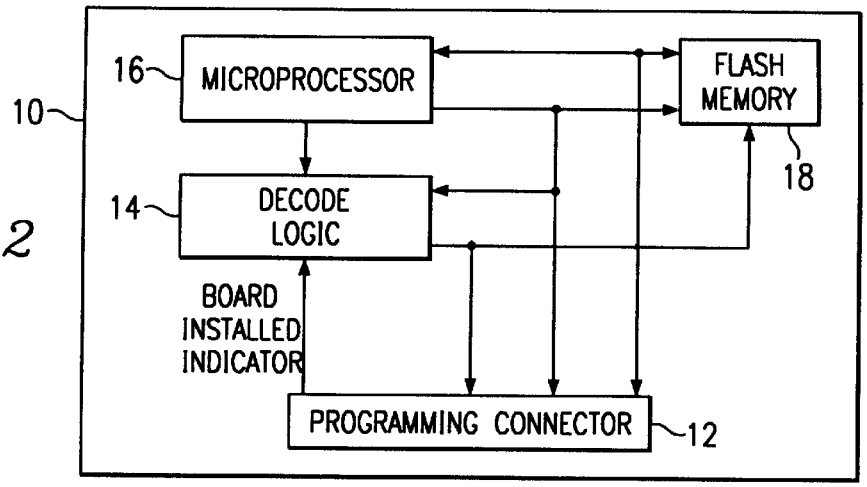
FIG. 2 illustrates a processor card with a programming connector in accordance with the teachings of the present invention.
Figure 3:
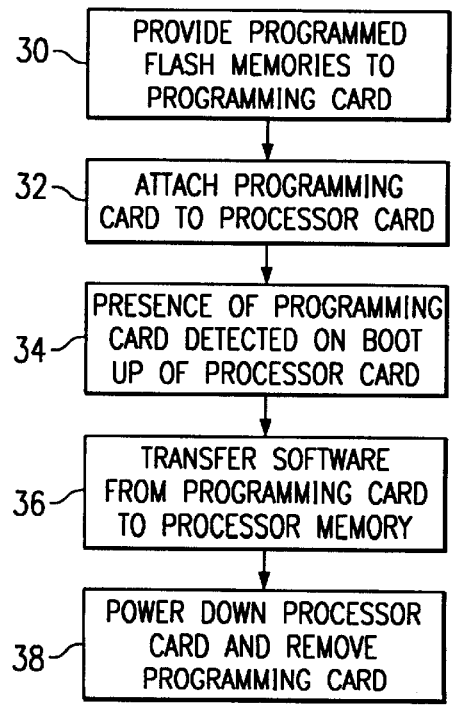
FIG. 3 is a flow chart getting a method of operation in accordance with the teachings of the present invention.

Embodiments of the present invention and its advantages are best understood by referring to FIGS. 1 through 3 of the drawings, like numerals being used for like and corresponding parts of the various drawings.

FIG. 1 illustrates a programming card in accordance with the teaching of the present invention. Programming card 20 comprises a programming card connector 22 and programming card flash memory 26. Flash memory 26 includes one or more flash memory devices. Flash memory 26 can be programmed and reprogrammed numerous times. In one embodiment, flash memory 26 is one or more EPROMS (erasable programmable read only memory) or EEPROMS (electronically erasable programmable read only memory). This type of memory can be programmed and retains the programing until erased, either electrically or under a strong ultra-violet light. Once erased, flash memory 26 can be reprogrammed.

Programming card connector 22 provides an interface connection between programming card 20 and a processor card (further described in FIG. 2). Programming card connector 22 can connect directly to another card or can connect via a suitable interface cable to another card. Programming card connector 22 can also connect to a flash device programmer (not pictured) to allow flash devices 26 to be erased and reprogrammed. Alternatively, individual flash devices 26 can be removed and reprogrammed on an external programmer (not pictured).

Programming control board flash devices 26 can have a variety of programming loaded onto it. It can have an initial boot code, it can have upgraded programming loaded onto it with a new boot code, or can have self-test arrangements loaded onto it. A boot code is the initial code that tells a microprocessor how to execute subsequent code. Self-test arrangements can include programs that allow the processor to test itself or other components on the processor card (further described in FIG. 2). The ability to store and transfer different types of programming increases the versatility of programming card 20. Also, by providing the programming on a removable programmable control board 20 flash memory devices on the processor card (as described in FIG. 2) do not have to be handled or removed when a programming load is updated.

FIG. 2 illustrates a processor card with a programming connector in accordance with the teachings of the present invention. Processor card 10 comprises programming connector 12, a decode logic 14, a microprocessor 16, and a plurality of on-board flash memories 18. Programming connector 12 is operable to connect with programming card connector 22 of programming card 20 which contains programming card flash memories 26.

In operation, programming card 20 attaches to processor card 10 by connecting programming connector 12 with programming card connector 22. Decode logic 14 detects the presence of programming card 20 on power up of the processor card 10. Execution of code starts on programming card 20 instead of processor card 10. Programming card flash memories 26 are selected for initial code execution. The code contains boot code and a copy routine by which the boot program and other software programs from programming card 20 are copied to on-board flash memory 18. This is a much faster method of programming on-board flash memories 18 than using an external programmer to program on-board flash memories 18.

Also, the present invention allows for programming of on-board flash memories 18 without removal. Removal is not desired because it can damage the memories or the memories' holder and can cause static electricity to build up, potentially destroying the processor card. A further advantage of the present invention is that one programming card 20 can be used to program many processor cards 10. Once on-board flash memory 18 is programmed, processor board 10 is powered down and programming card 20 is removed.

In subsequent executions, when processor board 10 is powered up, the code will boot from on-board flash memory 18. When it is necessary to replace the boot code of onboard flash memory 18, programming card 20 can be programmed with a new programming load and the process can be started again. Alternatively, the programming card connected to programming connector 12 can include test codes to perform tests on processor board 10.

FIG. 3 is a flow chart indicating the method of operation of the present device in accordance with the teachings of the present invention. In step 30, programmed flash memories 26 are provided to programming card 20. In step 32, programming board 20 is coupled to processor card 10. On boot up, decode logic 14 detects the presence of the programming card 20 in step 34. The initial code stored in programming card flash memories 26 is then executed, and the boot code and other software are stored in on-board flash memory 18, in step 36. In step 38, the processor card 10 is powered down, and programming card 20 is removed.

Thus it is apparent that there has been provided, in accordance with the present invention, a method and apparatus for initial programming of flash based firmware that satisfies the advantages set forth above. Although a main embodiment has been described in detail, it should be understood that various changes, substitutions, and alterations readily ascertainable by one skilled in the art can be made herein without departing from the spirit and scope of the present invention as defined by the following claims.

What is claimed is:

1. An apparatus for programming flash based memories comprising:
   a control card having:
      a control card connector; and,
      at least one control card flash memory having an initial code stored thereon, and
   a processor card having:
      a processor card connector; and,
      on-board flash memory;
   wherein the control card is operable to connect to the processor card by connecting the control card connector with the processor card connector and transfer the initial code to the on-board flash memory.

2. The apparatus of claim 1, wherein the initial code is a test code.

3. The apparatus of claim 1, wherein the processor card includes a decode logic operable to determine if the control card is attached.

4. The apparatus of claim 1, wherein the control card flash memory and the on-board flash memory are electronically erasable programmable read only memories.

5. A method for programming flash based firmware comprising the steps of:
   providing a control card having a program stored on controller flash memory;
   connecting the control card to a processor card;
   booting the processor card;
   transferring the program from the control card to the processor card;
   powering down the processor board; and,
   removing the control card.

6. The method of claim 5, wherein the step of booting the processor card further comprises the step of detecting the presence of the control card.

7. The method of claim 5, wherein the program is a test program operable to test a processor card.

8. The method of claim 5, wherein the step of transferring the program further includes the step of storing the program in an on-board flash memory.

9. The method of claim 8, wherein the control flash memory and the on-board flash memory are electronically erasable programmable read only memories.

10. A controller card for programming flash based firmware, comprising:
    controller card flash memory coupled to a controller card connector, wherein an initial programming load is programmed onto the controller card flash memory and the controller card is operable to connect to and program a processor card.

11. The controller card of claim 10, wherein the initial programming is a test code.

12. The controller card of claim 10, wherein the processor card includes a decode logic operable to determine if the programmable card is attached.

13. The controller card of claim 10, wherein the controller card programs the processor card when the controller card is booted.

14. The controller card of claim 10, wherein the controller card flash memory is electronically erasable programmable read only memories.

* * * * *